United States Patent [19]

Rorer

[11] 4,239,841
[45] Dec. 16, 1980

[54] AIRCRAFT BATTERY

[75] Inventor: David L. Rorer, Redlands, Calif.

[73] Assignee: Teledyne Industries, Inc., Los Angeles, Calif.

[21] Appl. No.: 101,419

[22] Filed: Dec. 10, 1979

[51] Int. Cl.³ .............................................. H01M 2/02
[52] U.S. Cl. .................................................. 429/179
[58] Field of Search ................ 429/178, 179, 181, 183

[56] References Cited

U.S. PATENT DOCUMENTS

| | | | |
|---|---|---|---|
| 3,711,335 | 1/1973 | Daniel | 429/179 X |
| 3,767,467 | 10/1973 | Miller et al. | 429/179 |
| 4,121,017 | 10/1978 | Dougherty et al. | 429/178 X |
| 4,154,907 | 5/1979 | Crow | 429/179 |

Primary Examiner—Charles F. LeFevour

[57] ABSTRACT

A lead-acid aircraft battery having a unique arrangement for making connections to the battery. The arrangement includes L-shaped members on the upper surface of the casing having cylindrical apertures extending horizontally therethrough. Threaded pin terminals insert through a receptacle assembly positioned to a side wall of the battery housing and are fastened by nuts to the L-shaped members. The pin terminals have axially-aligned surfaces for engaging a tightening tool so that assembly time is substantially reduced.

3 Claims, 4 Drawing Figures

AIRCRAFT BATTERY

BACKGROUND OF THE INVENTION

This invention relates to batteries and, more particularly, to lead-acid aircraft batteries.

There have been many lead-acid aircraft batteries devised. In general, such batteries comprise a casing containing interleaved lead and lead oxide plates (hereinafter referred to as "lead" plates) in an acid electrolyte. The casing may be manufactured of a plastic material and may be supported within an aluminum exterior housing which protects against electrical interference. The lead plates are interconnected and are connected to terminals which project through the casing. In many of the more modern batteries, external terminals are molded into a receptacle mounted to the side of the housing so that the terminals extend horizontally therefrom and may be slid into position for making connection. Although such an arrangement functions quite satisfactorily in use, it complicates the assembly process and increases the cost of such aircraft batteries significantly.

It is an object of the present invention to provide a new and improved lead-acid aircraft battery.

It is another object of the present invention to provide an improved aircraft battery which is significantly less expensive to manufacture.

SUMMARY OF THE INVENTION

The foregoing and other objects of the invention are accomplished by a lead-acid aircraft battery having a unique arrangement for making electrical connections to the battery. Conductors lead from the lead plates within the battery to the upper surface of the casing where they terminate in L-shaped members having cylindrical apertures extending horizontally therethrough. Slide-on external terminals are bolted to the L-shaped members and project through a receptacle assembly and the sidewall of the battery housing. The exterior terminals have axially aligned surfaces which are adapted to receive a tightening tool and which bear against the exterior of the receptacle assembly. This arrangement allows the exterior terminals to be connected to the battery by power equipment after the casing and housing have been assembled thereby saving substantial time in battery assembly.

Other objects, features, and advantages of the invention will become apparent from a reading of the specification taken in conjunction with the drawings in which like reference numerals refer to like elements in the several views.

BRIEF DESCRIPTION OF THE DRAWINGS

FIG. 3 is a side view, partially cut away, of the battery shown in FIG. 1; and

DESCRIPTION OF THE PREFERRED EMBODIMENT

Figure 1:
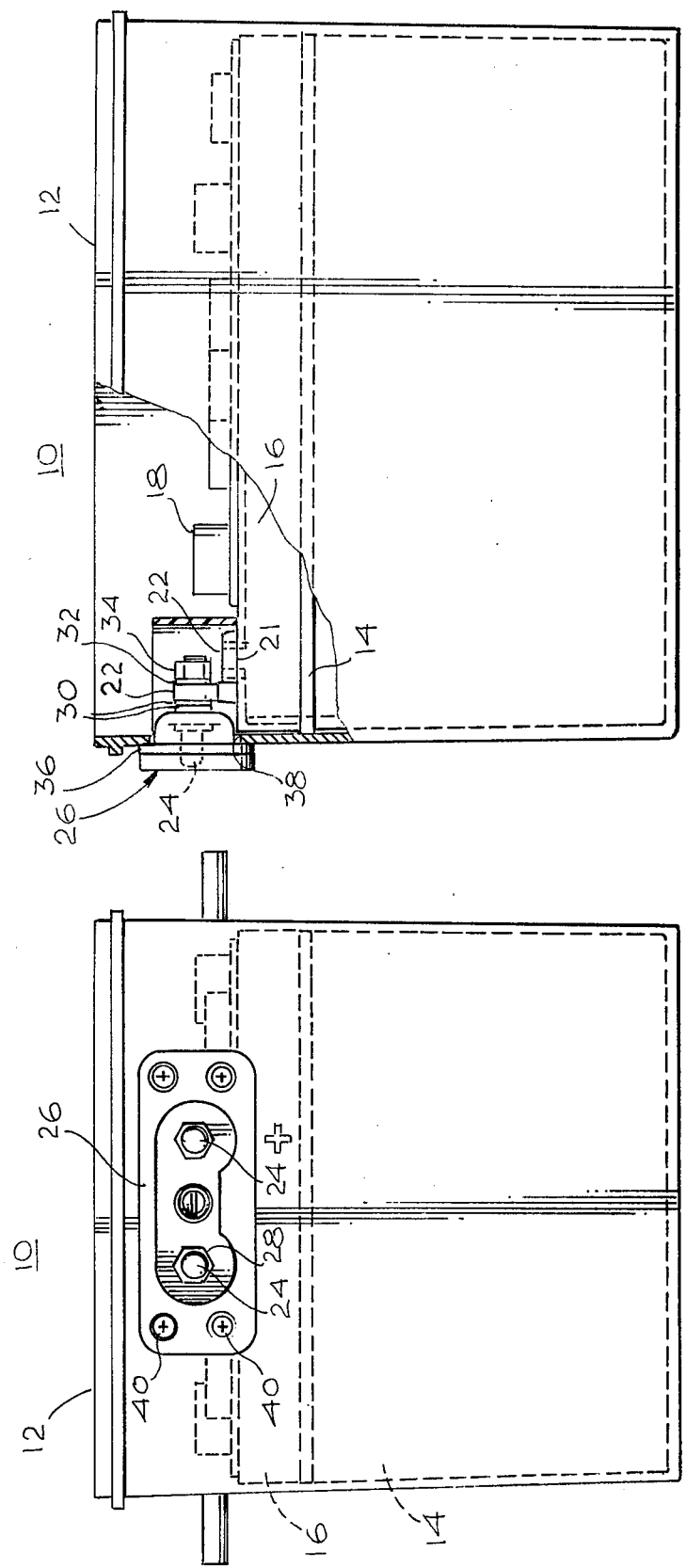
FIG. 1 is a front view of a lead-acid aircraft battery constructed in accordance with the invention.
Figure 2:
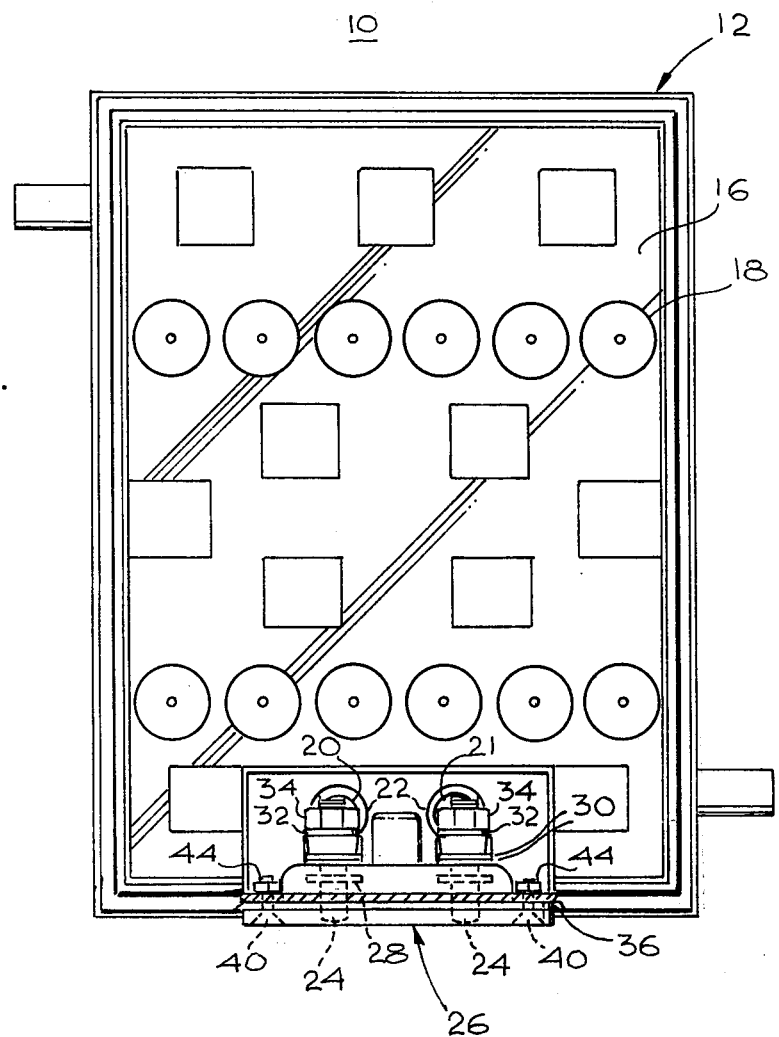
FIG. 2 is a top view, partially cut away, of the battery shown in FIG. 1.

Referring now to the drawings and, more particularly, to FIGS. 1, 2, and 3, there is shown a lead-acid aircraft bettery 10 constructed in accordance with this invention. The battery 10 comprises an external housing 12 normally constructed of aluminum to isolate the battery from electrical interference. In the housing 12 resides a molded interior casing 14 (often constructed of polyethylene) which has a number of separate cavities in which are placed the lead plates and the electrolyte material, not shown. The interior of the battery may be better understood by viewing FIG. 4. The casing 14 is covered by a cover 16 which may also be constructed of a moldable plastic material and has a number of vent plugs 18 (constructed in a well known manner) projecting therefrom. The vent plugs 18 are utilized to release gas pressure buildup within the battery 10 during operation. The lead and lead oxide plates are separated and are interconnected as is well known and ultimately terminate in negative and positive conductors which are connected through the cover 16 to positive and negative terminals 20 and 21. Each of the terminals 20 and 21 is permanently connected to an L-shaped member 22. The member 22 has an aperture extending horizontally therethrough through which extends one end of a terminal pin 24. Each pin 24 projects horizontally from the exterior of the battery 10 and proceeds through a circular aperture in a receptacle assembly 26. Each metallic pin 24 has a hex-shaped surface 28 adapted to mate with a wrench so that it may be rotated. The threaded ends of each pin 24 extend through the receptacle 26, a pair of washers 30, and the aperture in the metallic member 22 and receive another washer 32 and a nut 34.

As may be seen from the figures, the receptacle 26 fits through a washer 36 (which may be constructed of a plastic such as polypropylene) into an aperture 38 in the side of the housing 12. The receptacle 26 is secured to the housing 12 by four bolts 40 each of which extends through an aperture 42 and the housing 12 to receive nuts 44.

Figure 4:
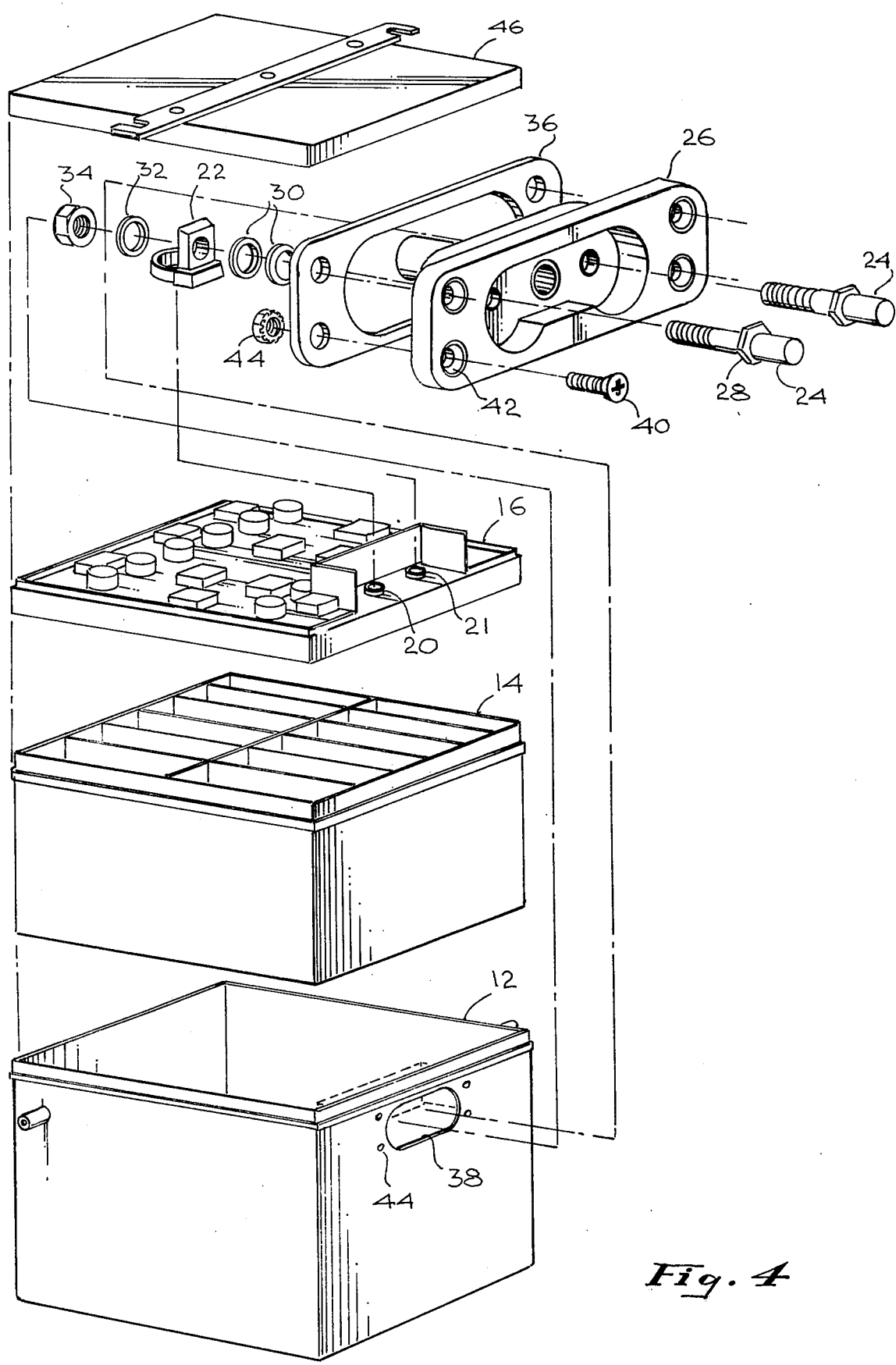
FIG. 4 is an exploded perspective view of the battery shown in FIG. 1 disclosing the details of assembly thereof.

As may be seen in FIG. 4, the battery is assembled in the following manner. The casing 14 receives the lead plates which are interconnected in a well known manner. Next, the internal conductors are connected. The L-shaped members 22 are connected to the terminals 20 and 21, and the cover 16 is sealed to the casing 14. Then, the casing 14 is lowered into the exterior housing 12. The receptacle 26 with the washer 36 is placed through the aperture 38 in the housing 12. The pins 24 are inserted and the washers 30 and 32 and nuts 34 placed thereon. The bolts 40 are inserted and tightened into nuts 44. Once in place, the pins 24 are tightened into the nuts 34 to the appropriate tightness, usually by a power wrench. This method of assembly allows a substantial amount of time to be saved in the assembly of the battery, often as much as fifteen minutes per battery. This arrangement is to be contrasted with prior art arrangements in which the external terminals are molded into receptacle assemblies and must be hand tightened to terminals on the casing. Once the receptacle assembly with pins 24 has been assembled and tightened as explained, the area surrounding the terminals 20 and 21 is covered with a liquid resin for protective purposes, and the casing 14 is sealed to the housing 12. Finally, an aluminum cover 46 is placed over the housing 12.

As will be understood, the battery 10 is then ready for use. External connections to the terminals 24 are normally made by a socket containing female receptacles for connection to the terminals 42.

Although a preferred embodiment has been shown and described, various other embodiments and configurations will be obvious to those skilled in the art without departing from the spirit and scope of the invention.

What is claimed is:

1. An aircraft battery comprising a housing having an aperture in a wall thereof, a casing having a pair of electrical conductors leading therefrom, a cover for the casing through which the pair of conductors protrude, a pair of electrically conductive members each connected to one of the conductors and having an aperture therein aligned with the aperture in the wall of the housing, a receptacle positioned within the aperture in the wall of the housing and having apertures therethrough aligned with the apertures in the pair of members, a pair of electrically conductive pins each threaded at one end and having a surface thereon adapted to receive a wrench for rotating it about its axis, each pin being positioned with its threaded end passing through the apertures in the receptacle and the member and its other end extending beyond the housing, and means for securing the threaded ends of the pins to the members.

2. An aircraft battery as claimed in claim 1 wherein the surface on each of the pair of pins is a regular hexagonal surface positioned between the threaded end and the other end thereof and adapted to exert pressure upon the receptacle when in place.

3. An aircraft battery as claimed in claim 1 in which the means for securing the threaded ends of the pins to the members comprises nuts adapted to fasten to the threaded ends of the pins.

* * * * *